United States Patent Office 3,395,512
Patented Aug. 6, 1968

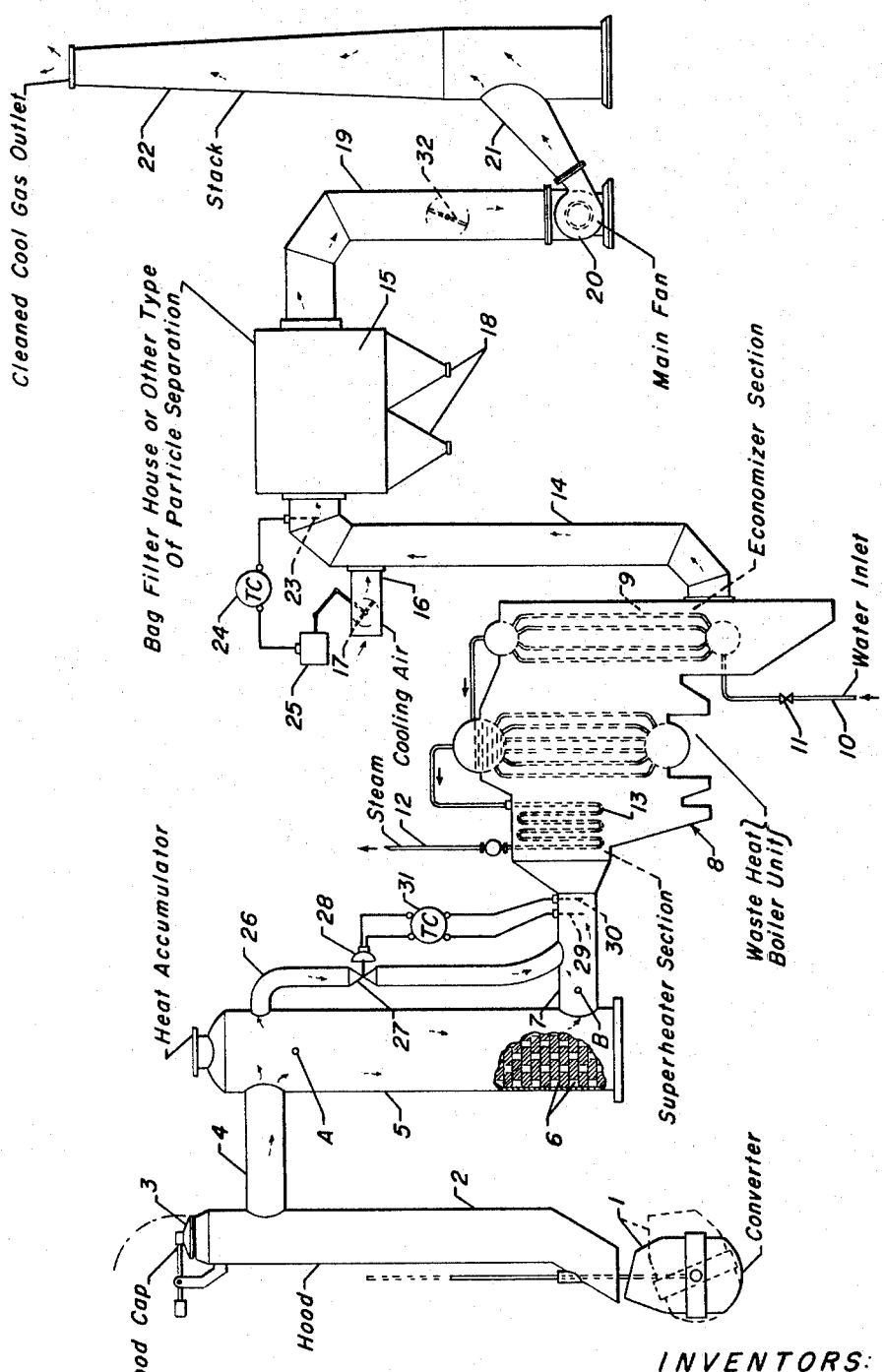

3,395,512
METHOD AND MEANS FOR COOLING AND CLEANING HOT CONVERTER GASES
James A. Finney, Jr., Greenwich, Conn., and Richard Jablin, Bethlehem, Pa., assignors of one-half to Universal Oil Products Company, Des Plaines, Ill., a corporation of Delaware, and one-half to Bethlehem Steel Corporation, Bethlehem, Pa., a corporation of Delaware
Filed Mar. 21, 1966, Ser. No. 543,471
8 Claims. (Cl. 55—80)

ABSTRACT OF THE DISCLOSURE

System and method for cleaning and recovering heat from particle laden hot waste gases from a basic oxygen converter. The gases are passed serially through a refractory heat accumulator, a waste heat boiler, a bag filter means, fan and stack in that order, the cleaned gases then being discharged to atmosphere. Between converter blows outside air is drawn through the above apparatus in the same flow direction whereby to maintain a sustained heat release in the waste heat boiler.

---

The present invention is directed to means for effecting the cooling and cleaning of a hot waste gas stream, such as from a basic oxygen converter installation. More particularly, the invention provides an improved processing system that is specifically adapted to the handling of intermittently generated hot waste gases that are laden with air polluting particles whereby there is the recovery of useful heat from such gases as well as particle removal therefrom.

Steel is still being produced by the open hearth method and the Bessemer Process where air is either passed over or through a molten charge of metal; however, at the present time, there is an increase in the use of the preferred basic oxygen system where pure oxygen is introduced through a lance tube down into the converter so as to provide a resulting more rapid production of steel. Such a process gave rise to the intermittent generation of a particle laden hot waste gas stream which should be subjected to treatment to preclude contamination of the surrounding atmosphere. Since the oxygen is introduced as a high velocity jet stream down into the converter, there is a resulting generation of very high temperature gases and considerable entrainment of smoke, dust, and fines. Also, in connection with the basic-oxygen process, where there is a great amount of smoke and flame from above the converter, it has been standard practice to have efficient enclosing hoods or furnace housings provided above and in combination with the open top of the converter to serve as a spark trap as well as an initial gas collecting zone to confine the flame and smoke.

In order to actually control the air pollution problem on connection with steel plants, various methods have been proposed and/or tried to effect the cooling and cleaning of the hot waste gases from the converter blows. For example, there has been the use of various types of scrubber systems; however, such systems give rise to the problems of expensive water consumption, condensation of moisture in the system during off peak periods, water disposal, steam plumes in cold weather, etc. In related types of systems, there has been the use of spray cooling means in combination with waste heat boiling means; however, with the cyclic type of operation encountered by reason of the intermittent blows from the converter there is generally an unsatisfactory heat recovery from the hot waste gases. In one dry type of cooling and particle collecting system, there has been the use of a reverse flow heat accumulator means to reduce the temperature of the hot gases sufficiently to pass them into bag or cloth filter gas cleaning equipment. This type of particle removal equipment of course requires that the temperature of the gases be reduced to the order of 250° F. to preclude damage to the bag or cloth filter means. Also, as a part of the operation, these heat accumulator systems have been required, after each converter blow, to have a reverse flow of cooling air to in turn effect a cooling of the refractory material and make it ready for the next converter blow. Such reversal of flow has the disadvantage of causing the dislodging of particles from the accumulator to in turn cause some degree of air pollution. In the foregoing system, there is also the need of an additional fan and air duct means, as well as damper means, to provide for the reversing flow of air through the heat accumulator section.

It is thus a principal object of the present invention to provide an economical dry type of cooling and cleaning system which utilizes a uni-directional flow for the hot waste gases from the converter so as to preclude any air pollution problem.

It is also an object of the invention to provide a multiple stage type of operation in a water-free dry type of cooling and cleaning system which effects a sustained heat input into a waste heat boiler and economizer unit so as to in turn obtain useable steam production from an intermittent type of converter operation while at the same time cooling the hot gas stream to a low temperature below that of the steam stream being generated.

Broadly, the present cooling and cleaning system which is adapted to accommodate the intermittent discharge of hot process unit discharge gases, embodies multiple stages of contact, with one cycle providing means for passing a hot gas flow stream with entrained particulates from the process unit into contact with a refractory heat absorbing material within a heat accumulator zone, passing the thus partly cooled gas stream into indirect heat exchange with at least one fluid medium in a heat recovery zone, then passing the resulting cool waste stream from the heat recovery zone into a particle removal zone from which it may be discharged to the atmosphere, and in an alternating cycle, where the process unit is not discharging hot waste gases, effecting the pulling of an air stream through the heat accumulating zone and said heat recovery zone whereby to effect a cooling of the heat absorbing material in the accumulator zone and the sustaining of heat input to the heat recovery zone.

A preferred embodiment of the system also incorporates a gas by-pass duct around the heat accumulator zone so as to give a more uniform heat supply to the heat recovery zone, which will generally be of the nature of typical waste heat boiler together with an economizer section. Suitable thermocouple means and control means can be provided between the inlet to the waste heat boiler and a valve in the by-pass duct so as to provide automatic temperature regulation. For a converter unit, generally, the hot gas flow through the by-pass will be desired at the beginning of a "blow-period" from the converter, at which time the brickwork in the heat accumulator will be relatively cool. On the other hand, at the end of a "blow-period," there may be excessive temperature from the heat accumulator and a desire to bring in cooler tempering air from the by-pass duct. Such cooler air is available from the converter hood system after a blow period has ended.

The present multiple stage cooling arrangement is such as to provide a gas outlet temperature from the heat recovery zone which readily permits the use of bag filtering means to in turn insure a clean discharge to the atmosphere. However, it is not intended to limit the present improved system and the method of operation to the use of only bag filtering means since other conventional types of separators, including electrical precipitator means or various combinations of precipitators and filters, may well be used in the particle removal portion of the unit.

Reference to the accompanying drawing and the following description will serve further to clarify the arrangement and operation of the present improved system, as well as point out additional advantageous features in connection therewith. Referring now to the drawing, there is indicated in a diagrammatic manner a converter 1, which is adapted to receive a downwardly injected oxygen lance, to in turn provide a rapid high temperature carbon removal from molten metal in the converter in the manner of the typical basic-oxygen process. Generally, the oxygen lance operation or "blow" will last from 18 to 30 minutes during which period there will be a virtual eruption of flame, hot gases and sparks from the top of the converter into an enclosing hood 2. As the carbon is being burned out of the steel in the converter, there will be large quantities of carbon dioxide, carbon monoxide and nitrogen, as well as considerable amounts of metal vapors, particularly of iron, silica and manganese, together with entrained particulates in the hot gaseous stream. The actual temperature of the gas stream is extremely high and will generally be of the order of 2,500° to 3,000° F. or higher.

At the top of the hood 2, there is indicated an explosion type of hinged door or hood cap 3 which, in the present operation, will generally remain closed inasmuch as all of the hot gases and entrained particles will carry through the multiple stages of the system to be discharged as a cleaned stream. The upper part of the hood 2 is connected with duct 4 to the upper end portion of a heat accumulator chamber 5 indicated as containing a checkerwork of solid refractory material 6. The heat accumulator zone 5 serves to operate in the manner of a "heat sink" by virtue of the heat absorbing material 6 which is placed throughout the height of chamber 5 in a manner effecting a direct contact between the gas stream and the heat absorbing surfaces. It is of course not intended to limit the present heat accumulator design and heat absorption operation to the use of any one particular type of refractory material. The refractory material 6 may comprise typical checkerwork patterns of fire brick which in turn may be formed of suitable types of fire clay, high silica content brick, carborundum, slag brick, etc. Also suitable types of heat absorbing metallic forms of brick work may be to advantage in the heat accumulator. A preferred design of chamber 5 and arrangement of packing 6 will provide means (not shown) for effecting the periodic removal of settled particulates from within the interior of the chamber and on the heat absorbing material.

The lower end of the heat accumulator chamber 5 is connected by means of duct work 7 to the lower portion of a waste heat recovery unit 8, normally having a plurality of tube banks housed therein to provide for an indirect heat exchange contact with a fluid medium to be heated in the tube bank means. The present drawing indicates diagrammatically that feed-water is initially introduced to an economizer section 9 of the boiler unit 8 by way of line 10 and valve 11 while steam is being withdrawn by way of line 12 from a superheater section 13. The resulting cooled waste gas stream will thus leave the waste boiler unit 8 by way of duct 14 at a temperature below that of the steam being produced in the unit. Duct 14 is shown being directly connective with a particle removal section 15. As is also shown in the drawing, for safety purposes, air inlet means may be provided for the introduction of a cooling or tempering air stream by way of duct 16 and control damper 17 into duct 14 such that there may be adequate temperature control and cooling of the gas stream being introduced into the separation zone 15. For automatic control, there is indicated diagrammatically, at the inlet to the particle collection zone 15, a thermocouple or other temperature sensitive member 23 which connects to a temperature controller 24. The latter connects to and operates a suitable motor means 25 that adjusts damper 17. Thus, where for some unusual reason, the gases leaving the heat recovery unit are too hot for entering the separator means 15 there can be automatic air tempering.

The separation zone 15 may house suitable bag filtering means to insure the discharge of a cleaned stream to the atmosphere although, as noted hereinbefore, other types of particle separating equipment may be used. Hopper means 18 is indicated diagrammatically at the lower end of the particle separation zone 15 so as to provide means for feeding separated particulates into suitable conveyor or transportating means.

At the cleaned gas outlet end of the separation zone 15, a duct 19 carries the waste gas stream through a suction fan 20 which in turn connects by way of duct 21 into the lower end of a stack 22 whereby the cleaned and cooled gas stream will be discharged into the atmosphere.

As hereinbefore noted, a preferred gas cooling and cleaning system provides a by-pass duct, such as 26 with control valve 27, around the heat accumulator 5. The control valve 27 can in turn have suitably controlled motor means 28 so that the valve can be opened where there is need of hot gas flow to increase temperature to the waste heat boiler 8 or, alternatively, when after a "blow period" there may be need of bringing in cooler air from the duct 26 to effect a tempering of hot gases from the accumulator 5. There are shown diagrammatically, high and low temperature sensitive means 29 and 30, at the inlet to the waste heat boiler, which connect to a temperature controller means 31. The latter in turn connects to the motor means 28 of control valve 27 in duct 26 to effect desired adjustments of hot gas tempering to the boiler 8.

In the initial period of a "blow" from the converter, the temperature control means 31 may be set to let some hot gases through duct 26 because of gases from the heat sink being too low in temperature. During most of the converter "blow" period or cycle, the present system operates to have the hot converter gas stream pass up through the hood 2 into the top of the heat accumulator 5 and provide a temperature that may well build up to the order of 2,000° F. or more at point "A," being indicated as the inlet end of the heat absorbing checkerwork material 6. Varying quantities of heat absorption material may of course be utilized in the accumulator zone 5; however, in a properly designed and sized unit, sufficient quantities will be used to provide a first stage temperature reduction for the waste gas stream so that point "B" at the discharge end of the accumulator 5, will be of the order of 800° to 1,000° F. Also, in the waste heat water boiler 8 sufficient tube bank means and economizer means is provided to effectively supply useful steam energy and to reduce the waste gas temperature to the order of 250° F. or less. Thus, generally there will be no need for cooling air introduction through duct 16 into the particle separator 15, except where special low level cooling may be required to accommodate a particular type of particle removal equipment embodied therein or where there is a temporary misoperation of the heat recovery section. Where bag filtering means using synthetic fibers is utilized, the inlet air stream with entrained particulates should be of the order of not more than about 250° F. With glass fibers, temperatures of 500° F. may be accommodated. On the other hand, where mechanical separator means are used or where combinations of, for example, centrifugal and electrostatic separator means are utilized, then a slightly higher temperature may be permissible. Preferably, bag or cloth filter means are embodied in a final stage for the cleaning of the waste gas stream in order that there may be a highly efficient particle removal operation carried out, with a very minimum of particulate discharge into the surrounding atmosphere.

During the periods between converter blows, i.e. while the converter is being recharged with molten metal, the present system is designed to maintain a continuous operation, with outside air being drawn by means of the suction fan 20 into converter hood 2 and heat accumulator 5 and thence through the rest of the system. This operation provides for the gradual cooling down of the principal portion of the heating material 6 by reason of the outside air flow coming down through the height of accumulator 5. In other words, there is a cyclic cooling at point "A," in the inlet end of heat accumulator 5 whereby the temperature of solid heat absorbing material at such point gradually varies from the order of 2,000° F. to the order of 600°–800° F. Generally, the temperature at point "B" will remain substantially constant at 800° to 1,000° F. so that the inlet temperature into the waste boiler section 8 likewise remains relatively constant. This operation provides the continuous cyclic heating and cooling of the refractory material 6, with a temperature gradient occurring throughout the height of the heat accumulator zone 5. The inlet end having a wide temperature fluctuation and the outlet end having very little variation. However, the present system, with the use of automatic temperature controller means 31, can also bring cool air through duct 26 at a time right after a "blow" period when the hot gases from the accumulator 5 may be too hot to give an even temperature to the boiler 8.

The present improved system, utilizing an initial flow through the heat accumulator zone, necessarily requires the use of a heat accumulator unit for each converter unit. Thus, where there are two or more converters in a bank arrangement in order to have one converter being charged while another is being blown with oxygen; then additional heat accumulator zones should be furnished so as to provide means for the cyclic heating and cooling of each heat accumulator section along with the accompanying operation of a companion converter. On the other hand, two or more heat accumulator units may be connected with a single waste heat boiler means and single particle separator means such that there may be heat recovery and particle separation from a waste gas stream being combined from two or more converter units. In large installations there may also be duct work means provided to connect any one accumulator section with different converter hoods whereby one hood may be relined while another is being utilized for a converter blow.

Still further it should be pointed out that the equipment arrangement shown in the drawing may be readily varied and that it is not in any way limiting. For example, various types of horizonal heat accumulator arrangements may be provided in lieu of the vertical chamber design, and there may be different types and arrangements of placing the heat absorbing material in the unit. In addition, various more elaborate temperature and valve control systems may be incorporated into the overall system to effect desired temperature controlling to the waste heat boiler unit 8 and to the bag filter zone 15 through the regulation of one or more dampers or valves in each of the ducts 16 and 26. Adjustable damper means 32 may also be provided within duct 19 where it is desirable to control gas flow rates to the downstream treatment zones. Alternatively, damper means can be provided within ducts 7 or 14 to regulate overall gas flow rates, although the damper in duct 19 is generally preferable because of being located in a cooler and cleaner zone.

The present system has also been primarily directed to use with a basic oxygen converter, however, such system might well be utilized with an electric arc furnace or any processing unit which is similarly operated in an intermittent manner.

We claim as our invention:

1. A multiple stage method for recovering heat from a particle laden hot gas stream from an intermittently operating processing unit and for effecting the cleaning of such waste stream prior to its discharge to the atmosphere, which comprises, in one period passing the hot gas flow stream with entrained particulates from the processing unit into direct contact with a refractory heat absorbing material maintained within a heat accumulator zone, subsequently passing the resulting partially cooled gas stream in indirect heat exchange relationship with at least one fluid heat exchange medium in a heat recovery zone and effecting the further cooling of the gas stream while heating said fluid medium, withdrawing the resulting cooled gas stream from said heat recovery zone and subjecting it to cleaning in a particle removal zone prior to its discharge to the atmosphere, and in an alternating period pulling an air stream first through said heat accumulator zone in the same flow direction as said hot gas flow and then through said heat recovery zone whereby to effect a cooling of the heat absorbing material and the heating of said air stream for maintaining a sustained heat release in said heat recovery zone.

2. The method of claim 1 further characterized in that a portion of gas stream flow is by-passed around said heat accumulator zone to said heat recovery zone for controlled periods whereby there is a greater heat control input to said heat recovery zone.

3. The method of claim 1 further characterized in that said heat recovery zone includes economizer means together with waste heat boiler heat exchange tube means for steam generation, whereby the cooled gas discharge stream will be at a temperature level less than that of the resulting air stream.

4. The method of claim 1 further characterized in that a tempering air stream is controllably introduced into admixture with the cooled gas stream being withdrawn from said heat recovery zone to provide a flexible temperature control for the particle laden stream entering said particle removal zone.

5. Apparatus for effecting both cleaning and heat recovery with respect to a particle laden hot gaseous stream being discharged from an intermittently operating process unit, which comprises in combination, a heat accumulator section having an inlet end and an outlet end, said inlet end connecting with gas outlet means from said process unit and containing spaced refractory heat absorbing members adapted to provide a tortuous flow path for said hot gaseous stream between said inlet and said outlet ends, a gas outlet conduit from the outlet end of said accumulator section connecting with a waste heat boiler unit, said boiler unit having tubular means for passing a fluid medium in indirect exchange with the hot gas stream therein, duct means connecting said waste heat boiler unit with particle separating means having a laden gas inlet and cleaned gas outlet whereby there will be removal of entrained particles from said stream, suction fan means connecting with the gas outlet of said particle separator means and with stack means for the discharge of resulting cooled and cleaned gaseous streams.

6. The apparatus of claim 5 further characterized in that a gas by-pass duct connects said inlet end of said accumulator to said gas outlet conduit therefrom, and adjustable valve control means is provided in said by-pass duct, whereby gas flow may be controlled through said duct and temperature to said waste heat boiler more closely regulated.

7. The apparatus of claim 5 further characterized in that air inlet duct means with flow control means is connective with said duct means connecting the waste heat boiler with said particle separating means, whereby to provide temperature control to the latter.

8. The apparatus of claim 5 further characterized in that bag filtering means comprises at least a portion of said particle separating means whereby to provide a substantially particle free discharge stream from the apparatus to the atmosphere.

References Cited

UNITED STATES PATENTS

| | | | |
|---|---|---|---|
| 1,673,589 | 6/1928 | Plantinga | 122—471 |
| 2,623,505 | 12/1952 | Armacost | 55—269 |
| 2,729,301 | 1/1956 | Eckstrom | 55—269 |
| 3,118,759 | 1/1964 | Okaniwa et al. | 75—60 |
| 3,292,345 | 12/1966 | Wunderlich et al. | 55—73 |

FOREIGN PATENTS

| | | |
|---|---|---|
| 686,794 | 1/1953 | Great Britain. |
| 776,538 | 6/1957 | Great Britain. |

HARRY B. THORNTON, *Primary Examiner.*

B. NOZICK, *Assistant Examiner.*